United States Patent
Yamashita et al.

(10) Patent No.: US 9,398,222 B2
(45) Date of Patent: Jul. 19, 2016

(54) IMAGE DISPLAY DEVICE THAT DISPLAYS IMAGE AND DISPLAY BODIES SPECIFYING IMAGE'S PARTICULAR REGIONS, CONTROL METHOD AND STORAGE MEDIUM THEREFOR, AND IMAGE PICKUP APPARATUS

(71) Applicant: CANON KABUSHIKI KAISHA, Tokyo (JP)

(72) Inventors: Masahiro Yamashita, Kawasaki (JP); Akihiko Sato, Tokyo (JP); Kazuyoshi Kiyosawa, Inagi-shi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 14/031,357

(22) Filed: Sep. 19, 2013

(65) Prior Publication Data

US 2014/0078372 A1    Mar. 20, 2014

(30) Foreign Application Priority Data

Sep. 20, 2012 (JP) ................................ 2012-206967
Sep. 5, 2013 (JP) ................................ 2013-184110

(51) Int. Cl.
*H04N 5/222* (2006.01)
*H04N 5/232* (2006.01)
*G06K 9/00* (2006.01)

(52) U.S. Cl.
CPC ........ *H04N 5/23293* (2013.01); *G06K 9/00228* (2013.01); *G06K 9/00369* (2013.01); *H04N 5/23219* (2013.01)

(58) Field of Classification Search
CPC .................................................. H04N 5/23219
USPC ..................................................... 348/333.02
See application file for complete search history.

(56) References Cited

U.S. PATENT DOCUMENTS

| | | | | |
|---|---|---|---|---|
| 8,050,464 B2 * | 11/2011 | Yoshida | ......................... | 382/118 |
| 8,456,536 B2 * | 6/2013 | Sugino et al. | .............. | 348/222.1 |
| 2006/0061598 A1 * | 3/2006 | Mino et al. | ..................... | 345/629 |
| 2007/0242861 A1 | 10/2007 | Misawa et al. | | |
| 2009/0115868 A1 * | 5/2009 | Kim et al. | ................... | 348/222.1 |

FOREIGN PATENT DOCUMENTS

JP          2007-274207 A       10/2007

* cited by examiner

*Primary Examiner* — Usman Khan
(74) *Attorney, Agent, or Firm* — Rossi, Kimms & McDowell LLP

(57) ABSTRACT

An image display device capable of providing satisfactory user's visibility of an image including object images when the image and display bodies specifying particular regions of the object images are screen displayed. In a case where a horizontal direction distance between face detection frames for object images adjacent on a screen is equal to or less than a first threshold value and a vertical direction distance between face detection frames exceeds a second threshold value, a system controller of the image display device determines which one of the face detection frames is located on an upper side of the screen. A human body detection frame for the object image corresponding to the face detection frame determined as being located on an upper side on the screen is made non-display.

15 Claims, 17 Drawing Sheets

| OBJECT IMAGE NUMBER | DISPLAY OF FACE DETECTION FRAME | DISPLAY OF HUMAN BODY DETECTION FRAME |
|---|---|---|
| 701 | ON | ON |
| 702 | ON | ON |
| 703 | ON | ON |
| 704 | ON | ON |
| 705 | ON | ON |

| OBJECT IMAGE NUMBER | DISPLAY OF FACE DETECTION FRAME | DISPLAY OF HUMAN BODY DETECTION FRAME |
|---|---|---|
| 701 | ON | ON |
| 702 | ON | ON |
| 703 | ON | ON |
| 704 | ON | ON |
| 705 | ON | ON |

| OBJECT IMAGE NUMBER | DISPLAY OF FACE DETECTION FRAME | DISPLAY OF HUMAN BODY DETECTION FRAME |
|---|---|---|
| 701 | ON | ON |
| 702 | ON | ON → OFF |
| 703 | ON | ON |
| 704 | ON | ON |
| 705 | ON | ON |

| OBJECT IMAGE NUMBER | DISPLAY OF FACE DETECTION FRAME | DISPLAY OF HUMAN BODY DETECTION FRAME |
|---|---|---|
| 701 | ON | ON |
| 702 | ON | OFF |
| 703 | ON | ON |
| 704 | ON | OFF |
| 705 | ON | ON |

| OBJECT IMAGE NUMBER | DISPLAY OF FACE DETECTION FRAME | DISPLAY OF HUMAN BODY DETECTION FRAME |
|---|---|---|
| 701 | ON | ON |
| 702 | ON | OFF |
| 703 | ON | ON |
| 704 | ON | OFF |
| 705 | ON | ON |

IMAGE DISPLAY DEVICE THAT DISPLAYS IMAGE AND DISPLAY BODIES SPECIFYING IMAGE'S PARTICULAR REGIONS, CONTROL METHOD AND STORAGE MEDIUM THEREFOR, AND IMAGE PICKUP APPARATUS

BACKGROUND OF THE INVENTION

1. Field of the Invention

The present invention relates to an image display device that displays an image and display bodies specifying particular regions of the image, a control method and a storage medium for the image display device, and an image pickup apparatus having the image display device.

2. Description of the Related Art

Some of image pickup apparatuses such as digital cameras are configured to detect a particular region of an object and to display on an image display device a detection frame that specifies the detected particular region as well as to display a photographed object image.

For example, an image pickup apparatus having a face detection unit for detecting an object's face region and in which a face detection frame representing the detected face region is displayed in a manner overlapping an object image is disclosed in Japanese Laid-open Patent Publication No. 2007-274207. This image pickup apparatus displays the face detection frame whose attribute (such as color or shape) is changed according to a feature value (e.g., a face angle) of the object's face region, thereby enabling a user to intuitively perceive the feature of the object's face region.

Another image pickup apparatus is also known that has a human body detection unit for detecting a human body portion (human body region) of the object as well as having a face detection unit for detecting an object's face region and in which a human body detection frame representing the detected human body region is displayed in a manner overlapping an object image.

FIG. 14 shows an example of how a face detection frame and a human body detection frame are displayed in a conventional image pickup apparatus.

When a face detection unit and a human body detection unit of the image pickup apparatus operate independently of each other, a face detection frame 201 and a human body detection frame 202 are displayed on a display screen 200 as shown in FIG. 14 based on results of detection by the detection units in such a manner that the frames 201, 202 overlap an object image 203 and that the face detection frame 201 is surrounded by the human body detection frame 202. As a result, the user's visibility of the face detection frame 201 and the human body detection frame 202 (especially, the user's visibility of the face detection frame 201) lowers. To obviate this, the face detection frame is displayed separately from the human body detection frame, for example.

However, in a case that face detection frames and human body detection frames of a plurality of object images are displayed, most of the detection frames overlap one another as shown in FIG. 15, even if the face detection frames are displayed separately from the human body detection frames.

FIG. 15 shows an example of how face detection frames and human body detection frames are displayed in another conventional image pickup apparatus.

As shown in FIG. 15, five object images 1001 to 1005 are displayed on a display screen 200, and face detection frames 1001a to 1005a and human body detection frames 1001b to 1005b are displayed so as to correspond to the object images 1001 to 1005. As a result, most of the face detection frames 1001a to 1005a and the human body detection frames 1001b to 1005b overlap one another, thereby lowering the user's visibility of the object images 1001 to 1005.

SUMMARY OF THE INVENTION

The present invention provides an image display device capable of providing satisfactory user's visibility of an image including object images when the image and display bodies specifying particular regions of the object images are screen displayed, and provides a control method and storage medium for the image display device and an image pickup apparatus having the image display device.

According to one aspect of this invention, there is provided an image display device in which when an image including a plurality of object images is displayed on a screen of a display unit of the image display device, first and second display bodies specifying first and second regions of the object images can be displayed on the screen so as to be associated with the object images, comprising a determination unit configured, in a case where first regions of first and second object images are juxtaposed on the screen in a vertical direction, to determine which one of first display bodies for the first and second object images is located on an upper side on the screen, and a display control unit configured to decide that the second display body for the object image corresponding to the first display body determined by the determination unit as being located on an upper side on the screen is to be made non-display.

With this invention, the user's visibility of an image can be made satisfactory when the image (including object images) and first and second display bodies (e.g., face detection frames and human body detection frames) specifying particular regions of the object images are screen displayed.

Further features of the present invention will become apparent from the following description of exemplary embodiments with reference to the attached drawings.

DESCRIPTION OF THE EMBODIMENTS

The present invention will now be described in detail below with reference to the drawings showing preferred embodiments thereof.

First Embodiment

Figure 1:
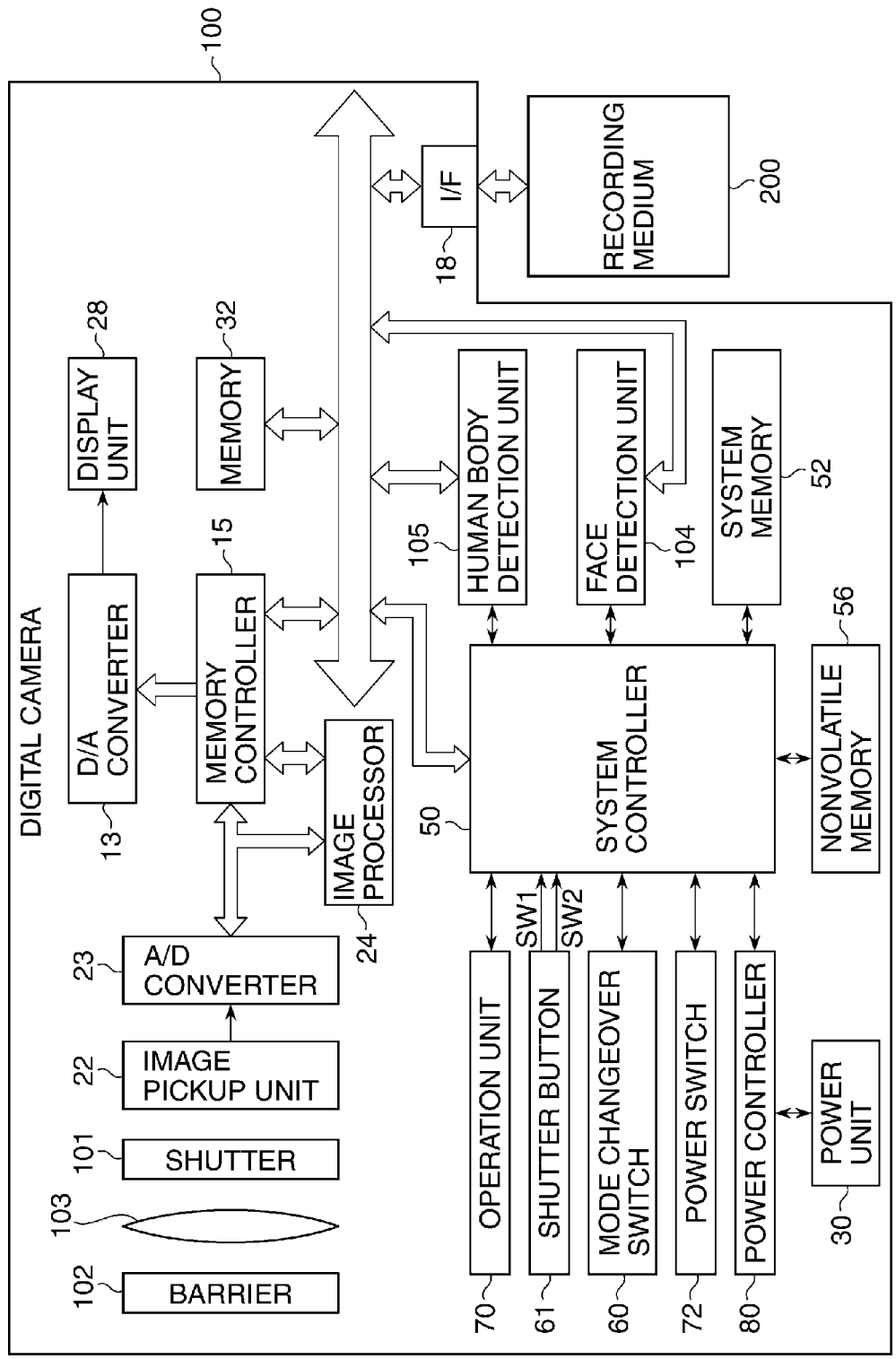
FIG. 1 is a block diagram showing an example construction of a digital camera, which is an example of an image pickup apparatus having an image display device according to an embodiment of this invention.

FIG. 1 shows in block diagram an example construction of a digital camera, which is an example of an image pickup apparatus having an image display device according to embodiments of this invention.

The illustrated image pickup apparatus, i.e., the digital camera (hereinafter, simply referred to as the camera) 100 has a photographic lens unit (hereinafter, simply referred to as the photographic lens) 103 that includes a focus lens. On the downstream side of the photographic lens 103, there is provided a shutter 101 (aperture-cum-shutter) having an aperture function. Instead of using the aperture-cum-shutter, an aperture and a shutter can be used, which are formed by separate members from each other.

An optical image (object image) having passed through the photographic lens 103 and the shutter 101 is formed on an imaging element of an image pickup unit 22. The image pickup unit 22 is comprised of a CCD or CMOS image sensor and outputs an electrical signal (analog image signal) obtained by photoelectrical conversion of the optical image formed on the imaging element. The analog signal is supplied to an A/D converter 23 for conversion into a digital signal (image data).

On a front side of the photographic lens 103, there is provided a barrier 102 that covers an image pickup system including the photographic lens 103, shutter 101, and image pickup unit 22, whereby the image pickup system is prevented from being soiled or damaged.

An image processor 24 performs resizing processing (such as pixel interpolation or size reduction) and color conversion processing on image data supplied from the A/D converter 23 or on image data supplied from a memory controller 15. The image processor 24 also performs predetermined computation processing by using the image data. Based on a result of the computation, a system controller 50 performs exposure control and distance measurement control. More specifically, the system controller 50 performs TTL (through-the-lens) AF (auto-focus) processing, AE (auto exposure) processing, and EF (electronic flash pre-emission) processing.

Furthermore, the image processor 24 performs computation processing by using the image data, and performs TTL AWB (auto white balance) processing based on a result of the computation.

Image data output from the A/D converter 23 is written into a memory 32 through the image processor 24 and the memory controller 15. Image data for being displayed on a display unit 28 is also stored into the memory 32. It should be noted that the memory 32 has a sufficient storage capacity large enough to store data of a predetermined number of still images and/or moving image data of predetermined time length and/or audio data of predetermined time length. The memory 32 also serves as a video memory for image display.

A D/A converter 13 converts image data for image display stored in the memory 32 into an analog signal, and supplies the analog signal to the display unit 28. According to the analog signal (image data), an image is displayed on the display unit 28, which is, e.g., an LCD.

A nonvolatile memory 56 is an electrically erasable and recordable memory such as an EEPROM, and stores e.g. programs and constants for use by the system controller 50 for its operation. A system memory 52 is e.g. a RAM and loaded with constants and variable for use by the system controller 50 for its operation and also loaded with e.g. programs read from the nonvolatile memory 56.

The system controller 50 for controlling the camera 100 performs various processes (described later) by executing programs stored in the nonvolatile memory 56. The system controller 50 controls the memory 32, D/A converter 13, display unit 28, etc., to carry out display control.

A mode changeover switch 60, a shutter button 61, and an operation unit 70 constitute an input operation unit for inputting various operation instructions to the system controller 50.

The mode changeover switch 60 is used to switch the operation mode of the system controller 50 among a still image recording mode, a moving image recording mode, a reproduction mode, etc.

The shutter button 61 is used to give a photographing instruction, and has first and second shutter switches. When the shutter button 61 is operated to be brought into a so-called half-pressed state, the first shutter switch is switched on and a first shutter switch signal SW1 (photographing preparation instruction) is given to the system controller 50. In response to this, the system controller 50 starts e.g. AF (auto-focus) processing, AE (auto exposure) processing, AWB (auto white balance) processing, and EF (electronic flash pre-emission) processing.

When the shutter button 61 is brought into a so-called fully pressed state, the second shutter switch is switched on and a second shutter switch signal SW2 (photographing instruction) is given to the system controller 50. In response to this, the system controller 50 starts to control a sequence of photographing processing from causing the image pickup unit 22 to output an image signal to writing of image data into a recording medium 200.

When any of function icons displayed on the display unit 28 is selectively operated, functions suitable for scene are assigned to operating members (buttons, keys, etc.) of the operation unit 70, and the operating members function as function buttons.

The function buttons includes e.g. an end button, return button, image shift button, jump button, aperture step-down button, and attribute change button. When a menu button is pressed, a menu screen for performing various settings is displayed on the display unit 28. The user is capable of intuitively performing various settings on the menu screen by using a four-direction button, a set button, or the like.

A power switch 72 is used to turn on/off the power of the camera 100.

A power controller 80 includes a battery detection circuit, a DC-DC converter, a switch circuit for switching blocks to be supplied with power, etc. and detects battery attachment/detachment, battery type, and battery residual capacity. In accordance with a result of detection and an instruction from the system controller 50, the power controller 80 controls the DC-DC converter to supply desired voltages to various parts (including the recording medium 200) for desired time periods.

A power unit 30 has e.g. a primary battery (such as an alkaline battery or a lithium batter) or a secondary battery (such as a NiCd battery, NiMH battery, or Li battery) and an AC adapter terminal. An interface (I/F) 18 is an interface with the recording medium 200 that is a hard disk or a memory card implemented by e.g. a semiconductor memory.

The system controller 50 is connected with a face detection unit 104 and a human body detection unit 105. The face detection unit 104 detects face regions of object images in image data stored in the memory 32. The human body detection unit 105 detects human body regions of object images in image data stored in the memory 32. The face regions and the human body regions are particular regions of object images.

With the camera 100, it is possible to perform photographing using so-called central one point AF where AF is performed on a central one point on the photographic screen and also possible to perform photographing using so-called face AF where AF is performed on at least one face region detected by a face-detecting function of the face detection unit 104.

In the following, a description will be given of the face-detecting function of the face detection unit 104, which can be realized under the control of the system controller 50.

The face detection unit 104 performs horizontal direction band-pass filter processing on image data input from the memory 32 and performs vertical direction band-pass filter processing on the image data that has undergone the horizontal direction band-pass filter processing, thereby detecting edge components of the image data.

Next, the face detection unit 104 performs pattern matching on the detected edge components to extract candidate groups of eyes, nose, mouth, and ears. Among extracted candidate groups of eyes, the face detection unit 104 determines candidates that satisfy predetermined conditions (e.g., distance between two eyes and inclination thereof) as being pairs of eyes and excludes candidate groups each of which does not constitute a pair of eyes, thereby narrowing down candidate groups of eyes.

Furthermore, the face detection unit 104 associates each of the narrowed-down candidate groups of eyes with other face parts (nose, mouth, and ears) that cooperate with the corresponding eyes to form a face, thereby deciding face region candidates, and then performs predetermined non-face condition filter processing on the face region candidates. Next, the face detection unit 104 excludes face region candidates determined as not satisfying the face condition, detects the remaining face region candidates as face regions, and outputs face information representing a detection result of face regions to the system controller 50. The system controller 50 stores the face information into the system memory 52.

In the following, a description will be given of a human body-detecting function of the human body detection unit 105, which can be realized under the control of the system controller 50. The human body detection unit 105 performs horizontal direction band-pass filter processing on image data input from the memory 32 and performs vertical direction band-pass filter processing on the image data that has undergone the horizontal direction band-pass filter processing, thereby detecting edge components of the image data.

Next, the human body detection unit 105 performs pattern matching on the detected edge components to determine whether the edge components correspond to contour shapes of human body regions, detects human body regions based on edge components corresponding to the contour shapes of human body regions, and outputs human body information representing a result of detection of human body regions to the system controller 50. The system controller 50 stores the human body information into the system memory 52.

Figure 2:
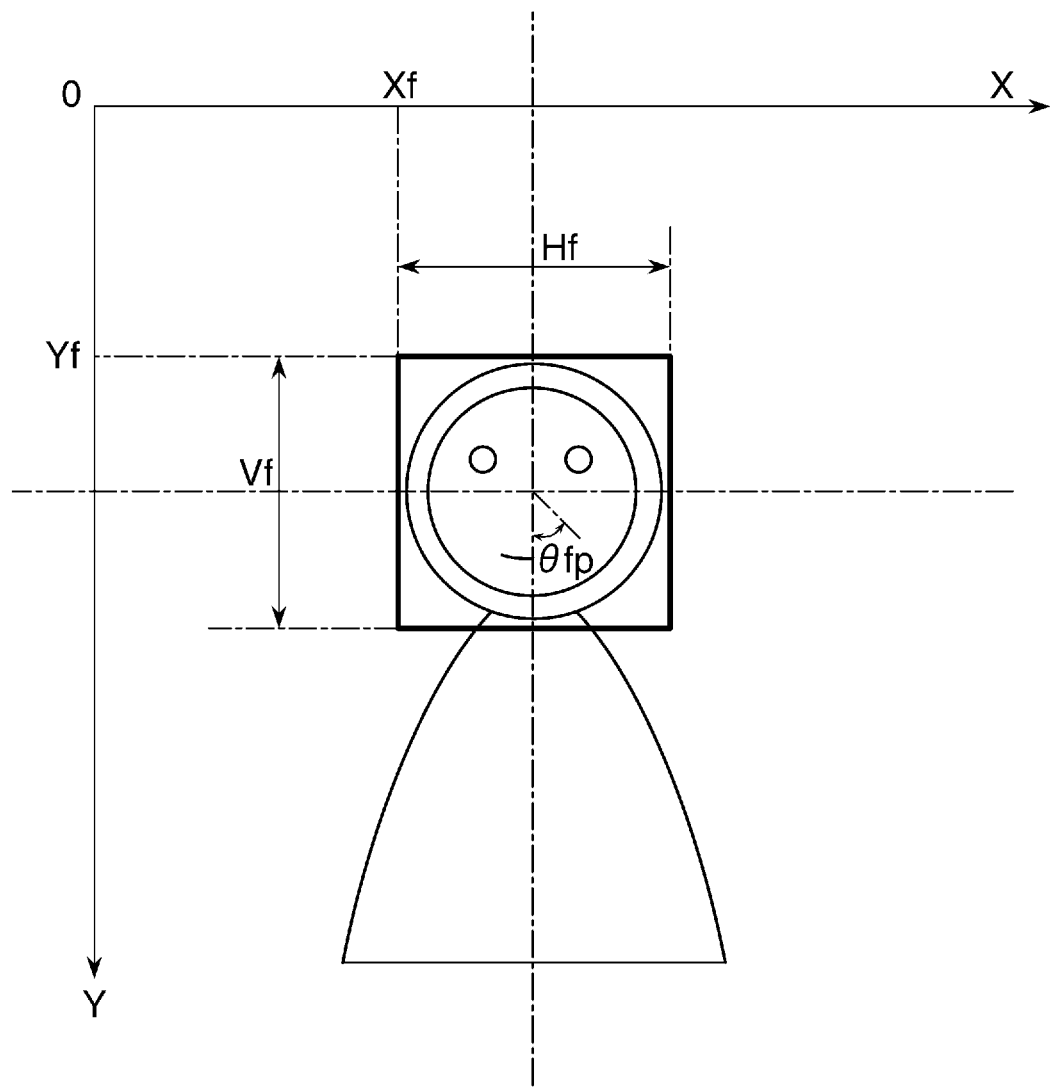
FIG. 2 is a view showing an example of face information obtained by a face detection unit of the digital camera.

FIG. 2 shows an example of face information (also referred to as the face detection information) obtained by the face detection unit 104 and displayed on the screen of the display unit 28.

The face information is specified by a face horizontal detection position Xf, a face vertical detection position Yf, a face horizontal detection size Hf, and a face vertical detection size Vf (each represented in units of pixels) in an XY coordinate system on the screen shown in FIG. 2 and also specified by a face pitch-direction detection angle $\theta fp$.

The face horizontal detection position Xf is positional information (X-axis coordinate value) that indicates a horizontal direction (X-axis direction) start point of a face region detected by the face detection unit 104. The face vertical detection position Yf is positional information (Y-axis coordinate value) that indicates a vertical direction (Y-axis direction) start point of the face region detected by the face detection unit 104.

The face horizontal detection size Hf is size information that indicates a horizontal direction size of the face region. The face vertical detection size Vf is size information that indicates a vertical direction size of the face region. The face pitch-direction detection angle $\theta fp$ is angle information that indicates an inclination of the face relative to the vertical direction. In the example shown in FIG. 2, there is a relation of $\theta fp=0$.

Figure 3:
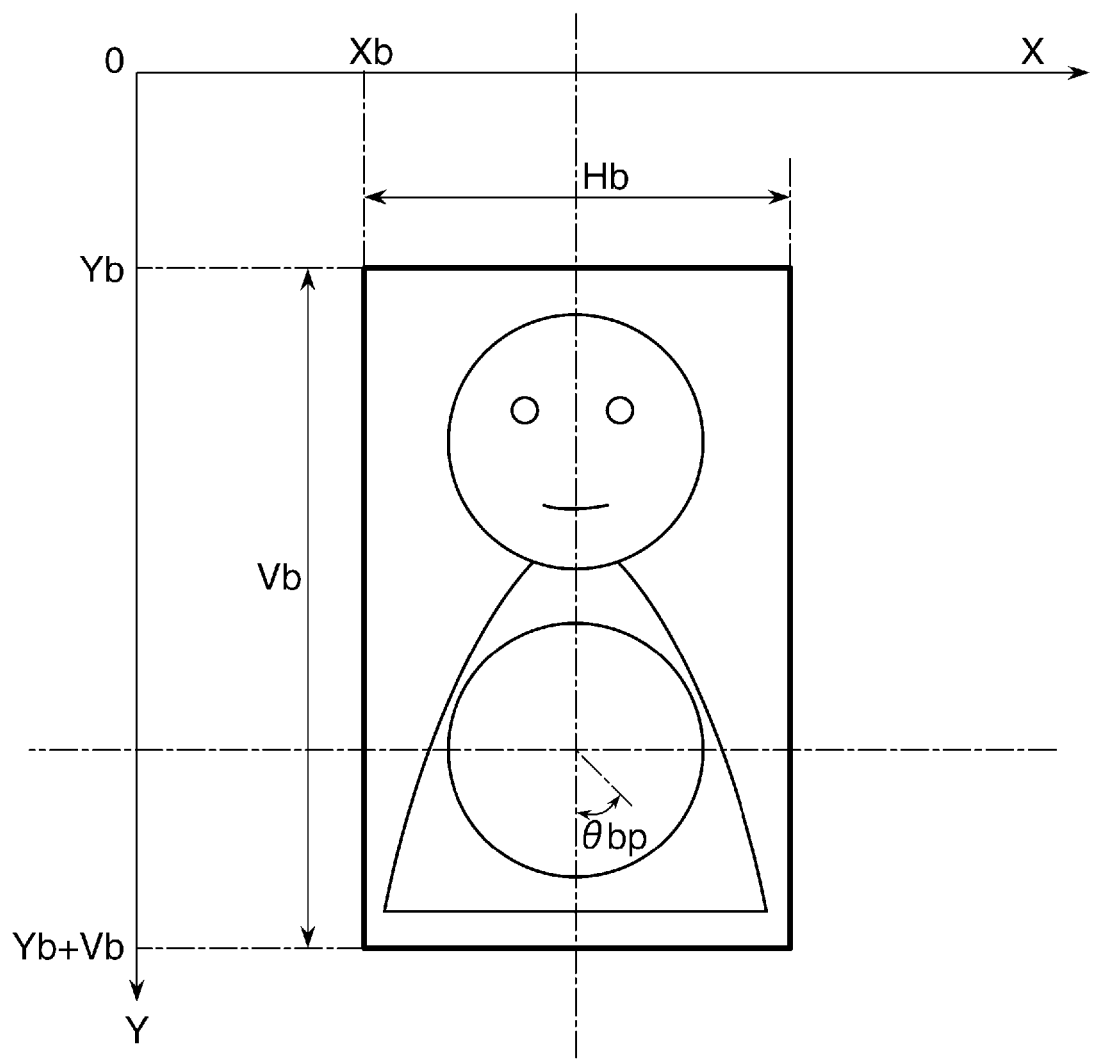
FIG. 3 is a view showing an example of human body information obtained by a human body detection unit of the digital camera.

FIG. 3 shows an example of human body information (also referred to as the human body detection information) obtained by the human body detection unit 105.

The human body information is specified by a human body horizontal detection position Xb, a human body vertical detection position Yb, a human body horizontal detection size Hb, and a human body vertical detection size Vb (each represented in units of pixels) in an XY coordinate system on the screen of the display unit 28 shown in FIG. 3, and also specified by a human body pitch-direction detection angle $\theta bp$.

The human body horizontal detection position Xb is positional information (X-axis coordinate value) that indicates a horizontal direction (X-axis direction) start point of a human body region detected by the human body detection unit 105. The human body vertical detection position Yb is positional information (Y-axis coordinate value) that indicates a vertical direction (Y-axis direction) start point of the human body region detected by the human body detection unit 105.

The human body horizontal detection size Hb is size information that indicates a horizontal direction size of the human body region. The human body vertical detection size Vb is size information that indicates a vertical direction size of the human body region. The human body pitch-direction detection angle θbp is angle information that indicates an inclination of the human body relative to the vertical direction. In the example shown in FIG. 3, there is a relation of θbp=0.

Figure 4:
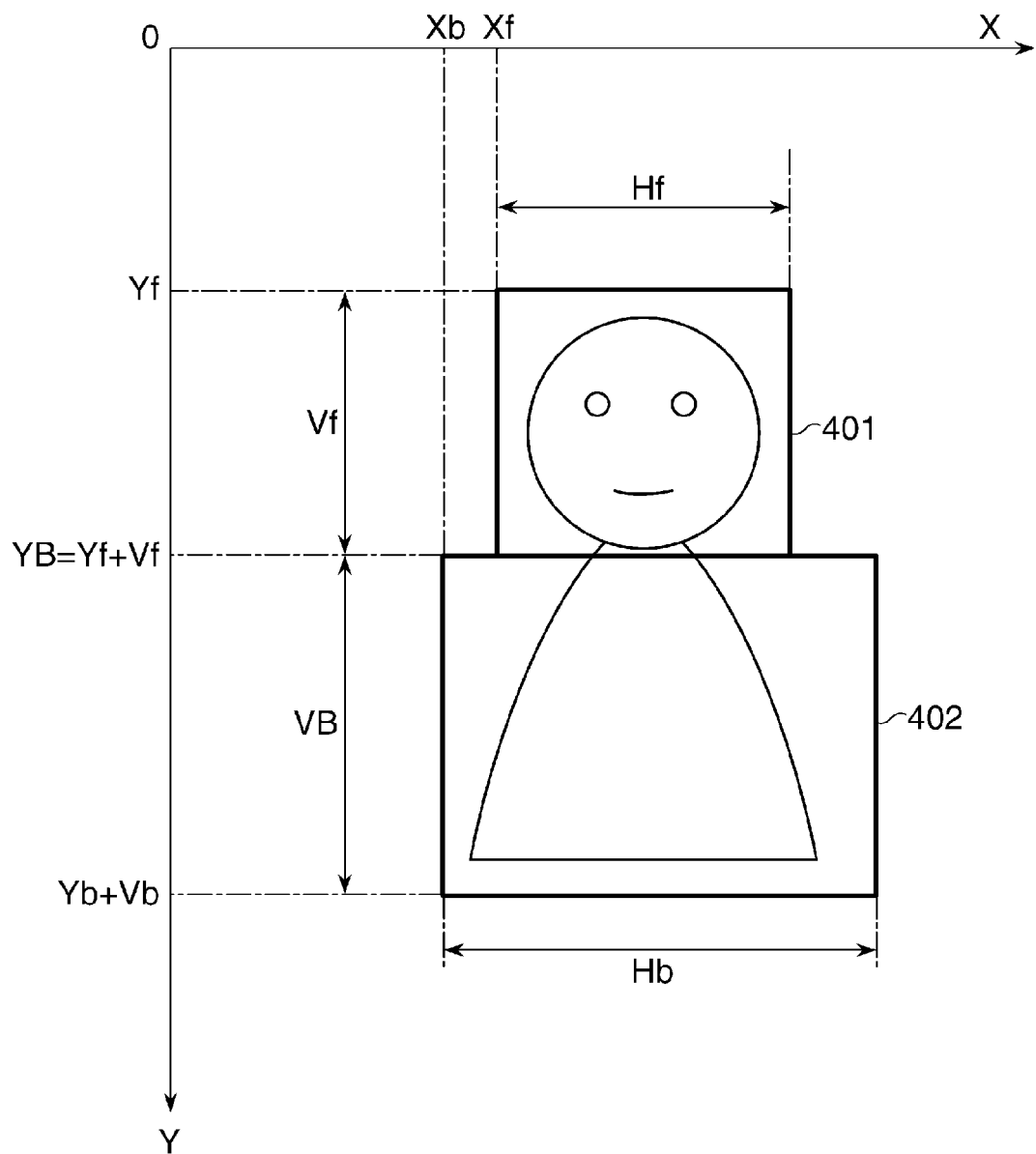
FIG. 4 is a view showing an example of a face detection frame and a human body detection frame created by a system controller of the digital camera.

FIG. 4 shows an example of a face detection frame (first display body) and a human body detection frame (second display body, which is also referred to as the body detection frame) that are created by the system controller 50. It should be noted that pieces of information that are the same as those shown in FIGS. 2 and 3 are denoted by the same symbols in FIG. 4.

The system controller 50 creates a face detection frame 401 shown in FIG. 4 based on face information obtained by the face detection unit 104.

The face detection frame 401 is a rectangular frame whose start point is at a coordinate (Xf, Yf) specified by the face horizontal and vertical detection positions Xf, Yf in the face information. The rectangular frame has an X axis direction end point that is at a coordinate (Xf+Hf, Yf) specified by the sum of the face horizontal detection position Xf and the face horizontal detection size Hf and specified by the face vertical detection position Yf, and has a Y axis direction end point that is at a coordinate (Xf, Yf+Vf) specified by the face horizontal detection position Xf and specified by the sum of the face vertical detection position Yf and the face vertical detection size Vf in the face information. An end point of the rectangular frame is at a coordinate (Xf+Hf, Yf+Vf).

The system controller 50 creates a human body detection frame 402 shown in FIG. 4 based on the face information obtained by the face detection unit 104 and the human body information obtained by the human body detection unit 105.

The human body detection frame 402 is a rectangular frame whose X axis direction start point is at the human body horizontal detection position Xb in the human body information and whose Y axis direction start point is represented by the sum YB of the face vertical detection position Yf and the face vertical detection size Vf in the face information. The rectangular frame has an X axis direction end point represented by the sum Xb+Hb of the human body horizontal detection position Xb and the human body horizontal detection size Hb in the human body information, and has a Y axis direction end point represented by the sum Yb+Vb of the human body vertical detection position Yb and the human body vertical detection size Vb in the human body information.

A start point of the human body detection frame 402 is represented by a coordinate (Xb, YB), and an end point thereof is represented by a coordinate (Xb+Hb, Yb+Vb). The human body detection frame 402 has a vertical display size VB equal to a value Yb+Vb−YB obtained by subtracting the Y coordinate value YB of the Y axis direction start point from the Y coordinate value Yb+Vb of the Y axis direction end point of the human body detection frame 402.

Figure 5:
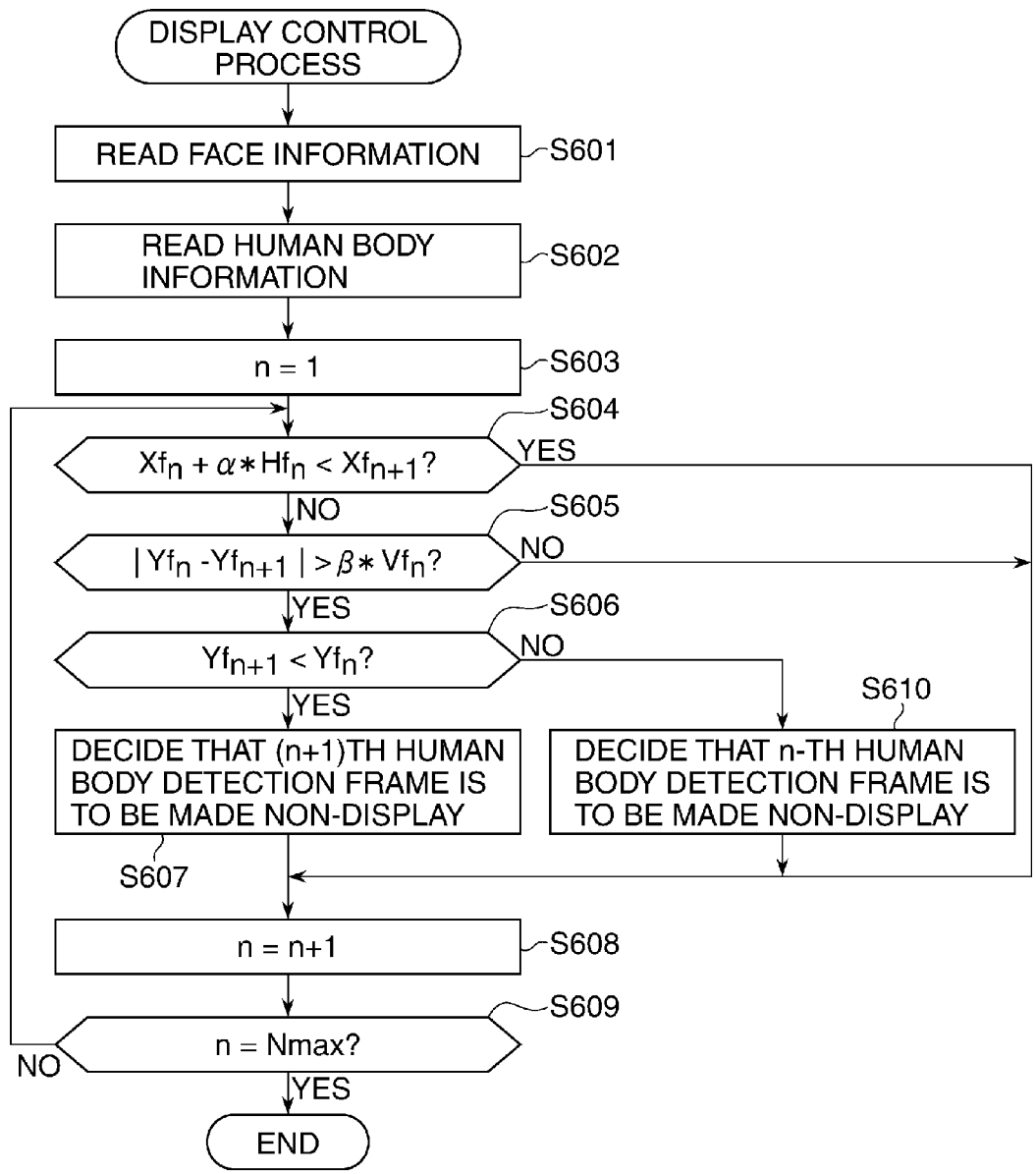
FIG. 5 is a flowchart showing the procedures of a display control process performed by the system controller to control display of face detection frames and human body detection frames.

FIG. 5 shows in flowchart the procedures of a display control process performed by the system controller 50 to control display of face detection frames and human body detection frames. In the display control process, the system controller 50 controls the display unit 28 via the memory controller 15.

At start of the display control process, the system controller 50 reads face information and human body information from the system memory 52 (steps S601 and S602).

In the present example, it is assumed that an initial setting is made such that face detection frames representing a plurality of (e.g. Nmax) face regions detected by the face detection unit 104 are displayed and human body detection frames representing a plurality of (e.g. Nmax) human body regions detected by the human body detection unit 105 are also displayed. If only face regions are detected, it is regarded that there are human body regions below the face regions. On the other hand, if only human body regions are detected, it is regarded that there are face regions above the human body regions. It is also assumed that identification numbers of 1, 2, ..., Nmax are assigned to face information and to human body information (in the ascending order of X coordinate values), which are recorded in the system memory 52. In the following, a coordinate (face detection coordinate) of the n-th face region (1≤n≤Nmax) is represented by (Xf$_n$, Yf$_n$).

Next, the system controller 50 sets an index n for specifying face information (face region) to an initial value of 1 (step S603).

Next, the system controller 50 determines based on the face horizontal detection positions Xf$_n$, Xf$_{n+1}$ in the n-th face information and in the (n+1)th face information whether or not the n-th and (n+1)th face regions (i.e., face detection frames corresponding to adjacent object images) are juxtaposed in the vertical direction (step S604).

In step S604, the system controller 50 determines e.g. whether or not the sum of the face horizontal detection position Xf$_n$ in the n-th face information and a predetermined first threshold value is equal to or less than the face horizontal detection position Xf$_{n+1}$ in the (n+1)th face information. The first threshold value is set to e.g. a value equal to the product α×Hf$_n$ of the horizontal size Hf$_n$ in the n-th face information and a predetermined gain value α.

If the answer to step S604 is NO, i.e., if a distance between the face horizontal detection positions Xf$_n$, Xf$_{n+1}$ in the n-th face information and in the (n+1)th face information is equal to or less than the first threshold value, the system controller 50 determines that the n-th and (n+1)th face regions are juxtaposed in the vertical direction.

Next, the system controller 50 compares the vertical direction position of the n-th face region with that of the (n+1)th face region. To this end, the system controller 50 determines e.g. whether or not the absolute value of a difference between the face vertical detection positions Yf$_n$, Yf$_{n+1}$ in the n-th face information and in the (n+1)th face information exceeds a predetermined second threshold value (step S605). The second threshold value is set to e.g. a value that is equal to the product β×Vf$_n$ of the vertical size Vf$_n$ in the n-th face information and a predetermined gain value β.

It should be noted that it is determined in step S605 that the two face regions are located vertically to each other, if the Y-axis direction distance between these face regions exceeds the second threshold value. If two face regions overlap in position each other both in the X-axis direction and in the Y-axis direction, it is considered that either one of the face regions has been erroneously detected. Usually, there is no composition where two face regions are extremely away from each other in the vertical direction. If two face regions are away from each other in the Y-axis direction to some extent, it is possible to determine that a human body region of an object image located on an upper side overlaps a face region of an object image located on a lower side.

If determined that the absolute value of the difference between the face vertical detection positions Yf$_n$, Yf$_{n+1}$ exceeds the second threshold value (YES to step S605), the system controller 50 determines which one of the face vertical detection positions Yf$_n$, Yf$_{n+1}$ in the n-th face information and in the (n+1)th face information is located on an upper side in the XY coordinate system. To this end, the system controller 50 determines e.g. whether or not there is a relation of Yf$_{n+1}$<Yf$_n$ (step S606).

If determined in step S606 that there is a relation of $Yf_{n+1} < Yf_n$, the n-th and (n+1)th face regions are juxtaposed in the vertical direction and the (n+1)th face region is located above the n-th face region on the screen of the display unit 28. If, in this state, the (n+1)th human body detection frame corresponding to the (n+1)th face information is displayed on the screen, the (n+1)th human body detection frame overlaps the n-th face detection frame, so that the screen display becomes hard to see.

Thus, if determined that there is a relation of $Yf_{n+1} < Yf_n$ (YES to step S606), the system controller 50 decides that the (n+1)th human body detection frame is to be made non-display (step S607). As a result, the (n+1)th human body detection frame is prevented from overlapping the n-th face detection frame on the screen, thereby preventing the screen display from becoming hard to see.

Next, the system controller 50 increments by one the index n that specifies face information (step S608), and determines whether or not there is a relation of n=Nmax (step S609). If determined that there is a relation of n=Nmax (YES to step S609), the system controller 50 completes the display control. On the other hand, if determined that the relation of n=Nmax is not satisfied but there is a relation of n<Nmax (NO to step S609), the system controller 50 returns to step S604.

If determined in step S606 that a relation of $Yf_{n+1} < Yf_n$ is not satisfied, the n-th and (n+1)th face regions are juxtaposed in the vertical direction and the n-th face region is located above the (n+1)th face region on the screen of the display unit 28. If, in this state, the n-th human body detection frame is displayed on the screen, the n-th human body detection frame overlaps the (n+1)th face detection frame on the screen, so that the screen display becomes hard to see.

Thus, if determined that the relation of $Yf_{n+1} < Yf_n$ is not satisfied (NO to step S606), the system controller 50 decides that the n-th human body detection frame is to be made non-display (step S610). As a result, the n-th human body detection frame is prevented from overlapping the (n+1)th face detection frame on the screen, thereby preventing the screen display from becoming hard to see.

If the answer to step S604 is YES, i.e., if determined that the n-th and (n+1)th face regions are not juxtaposed in the vertical direction, the process proceeds to step S608.

If the answer to step S605 is NO, i.e., if determined that the absolute value of a difference between the face vertical detection positions $Yf_n$, $Yf_{n+1}$ in the n-th face information and in the (n+1)th face information is equal to or less than the second threshold value, the system controller 50 proceeds to step S608.

In the following, a description will be given in detail of how face detection frames and human body detection frames are displayed according to the display control process already described with reference to FIG. 5.

Figure 6A:
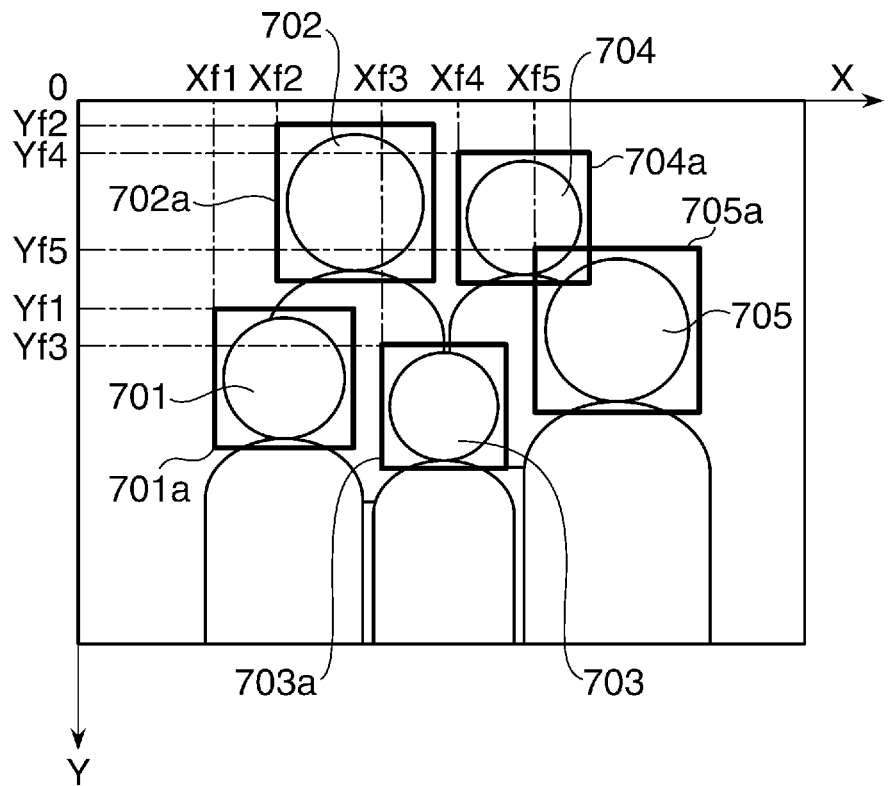
FIG. 6A is a view showing a state where face detection frames are screen-displayed according to the display control process shown in FIG. 5.
Figure 6B:
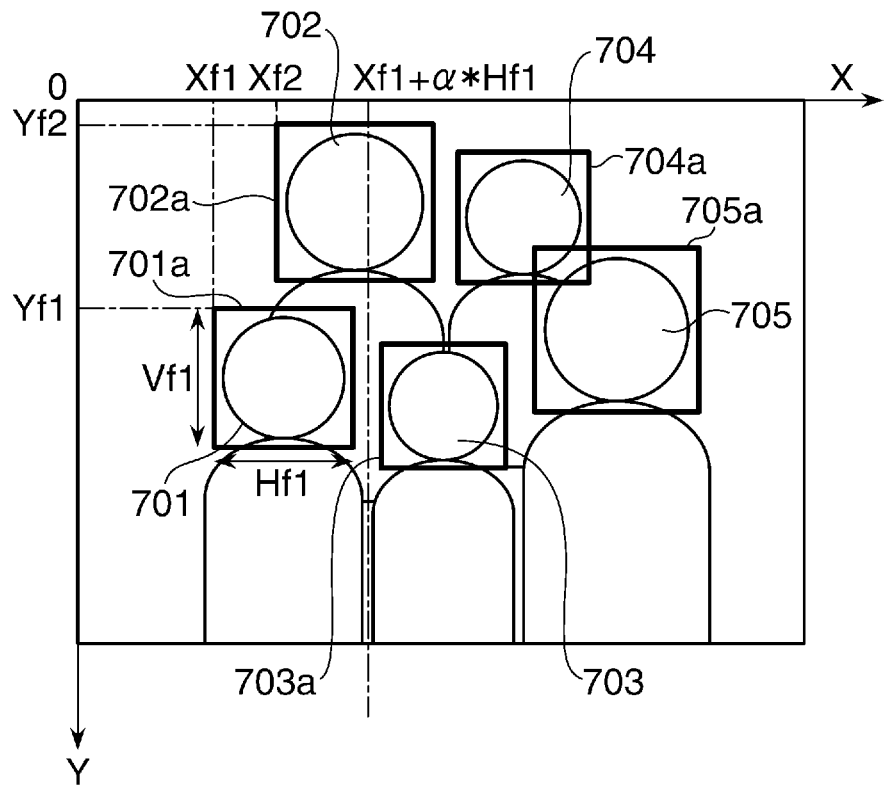
FIG. 6B is a view showing a state where face horizontal detection positions in two pieces of face information are compared with each other.
Figure 7A:
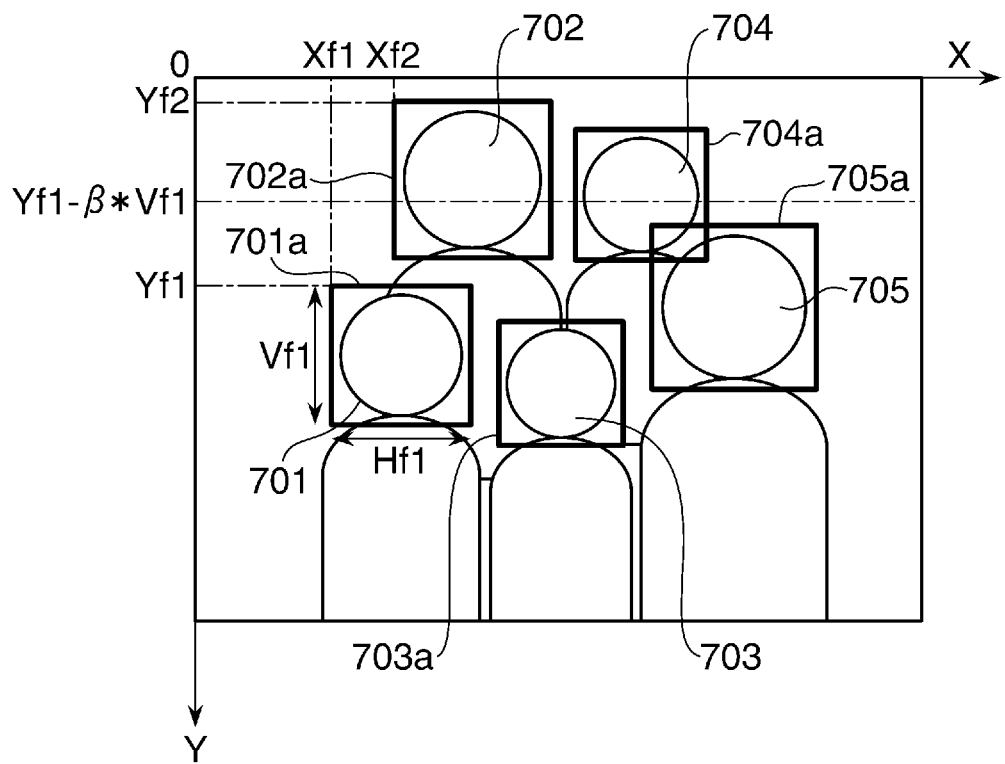
FIG. 7A showing a state where face vertical detection positions in two pieces of face information are compared with each other.
Figure 7B:
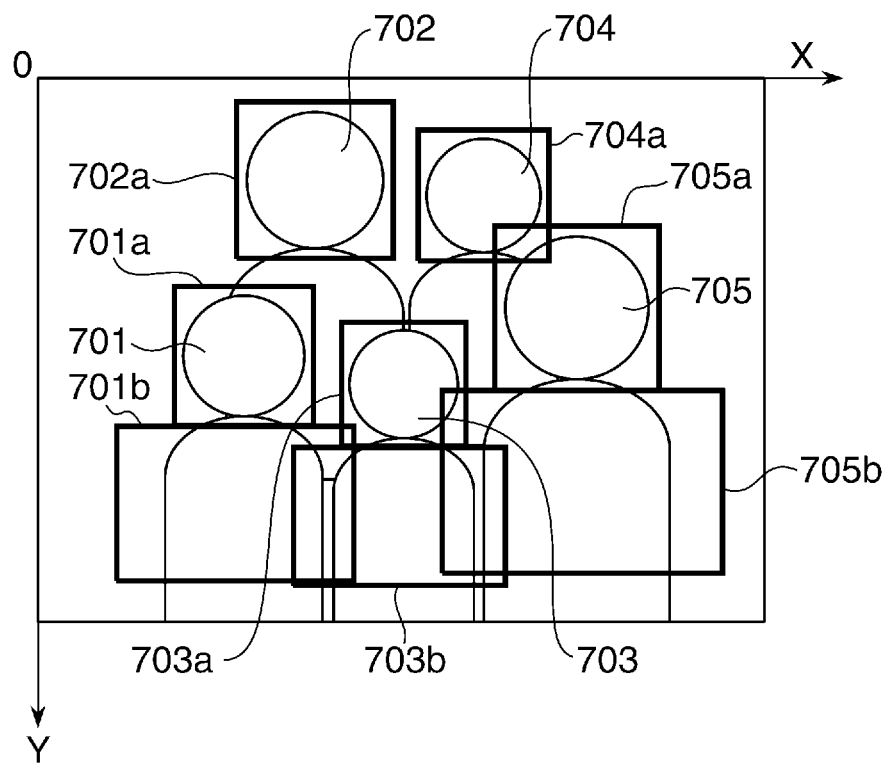
FIG. 7B is a view showing a state where face detection frames and human body detection frames are displayed.

FIG. 6A shows a state where face detection frames created based on face information read from the system memory 52 are screen-displayed, and FIG. 6B shows a state where face horizontal detection positions in two pieces of face information are compared with each other. FIG. 7A shows a state where face vertical detection positions in two pieces of face information are compared with each other, and FIG. 7B shows a state where face detection frames and human body detection frames are displayed.

In the example shown in FIG. 6A, five object images 701 to 705 are displayed on the screen of the display unit 28. The system controller 50 reads pieces of face information for five persons from the system memory 52, creates face detection frames 701a to 705a based on these pieces of face information, and causes the display unit 28 to display the face detection frames 701a to 705a thereon. In FIG. 6A, face detection coordinates of the face detection frames 701a to 705a are respectively represented by $(Xf_1, Yf_1)$, $(Xf_2, Yf_2)$, $(Xf_3, Yf_3)$, $(Xf_4, Yf_4)$, and $(Xf_5, Yf_5)$ in the ascending order of X coordinate values.

In step S604 of FIG. 5, the system controller 50 determines based on the face horizontal detection positions $Xf_1$, $Xf_2$ of the first and second object images 701, 702 whether or not a relation shown in the following formula (1) is satisfied.

$$Xf_1 + \alpha \times Hf_1 < Xf_2 \quad (1)$$

In formula (1), symbol $Hf_1$ denotes a horizontal size of the first face detection frame 701a.

It should be noted that in the present example, a setting is made to display the face detection frames 701a to 705a and human body detection frames (but the human body detection frames are not displayed as yet).

As shown in FIG. 6B, there is a relation of $Xf_1 < Xf_2 < (Xf_1 + \alpha \times Hf_1)$ in this example, so that a relation of $Xf_1 + \alpha \times Hf_1 > Xf_2$ is satisfied. Thus, the system controller 50 determines that the face detection frames 701a, 702a are juxtaposed in the vertical direction.

Next, in step S605 of FIG. 5, the system controller 50 determines based on the face vertical detection positions $Yf_1$, $Yf_2$ of the first and second object images 701, 702 whether or not a relation shown in the following formula (2) is fulfilled.

$$|Yf_1 - Yf_2| > \beta \times Vf_1 \quad (2)$$

In formula (2), symbol $Vf_1$ denotes a vertical size of the first face detection frame 701a.

In an example of FIG. 7A, there is a relation of $Yf_2 < (Yf_1 - \beta \times Vf_1) < Yf_1$, so that the relation shown in formula (2) is satisfied. Accordingly, the system controller 50 determines that the face detection frames 701a, 702a are in proximity to each other in the vertical direction, and proceeds to step S606 in FIG. 5 where the system controller 50 determines which one of the face vertical detection positions $Yf_1$, $Yf_2$ is located on an upper side on the display screen.

In this example, since there is a relation of $Yf_2 < Yf_1$, the system controller 50 determines that the face detection frame 702a is located above the face detection frame 701a on the display screen, and proceeds to step S607 in FIG. 5 where the system controller 50 decides that the human body detection frame corresponding to the object image 702 is to be set at non-display (OFF).

More specifically, in this example, the face detection frames 701a, 702a are juxtaposed in the vertical direction and the face detection frame 702a is located above the face detection frame 701a. If the human body detection frame corresponding to the object image 702 is screen displayed, the resultant screen display becomes hard to see. Thus, as shown in FIG. 7B, the human body detection frame 701b corresponding to the object image 701 is displayed, but the human body detection frame corresponding to the object image 702 is set at non-display (i.e., display of the human body detection frame is changed from ON to OFF).

It should be noted that the display control process shown in FIG. 5 is a mere example, and this is not limitative. It is possible to determine by another method to determine whether or not there is produced a portion where a face detection frame for a face region of a certain object image overlaps a human body detection frame for a human body region of another object image when these frames are displayed at the same time.

In the example shown in FIG. 6A, five object images 701 to 705 are screen displayed. The system controller 50 performs the above-described determinations such as determining based on face detection coordinates $(Xf_2, Yf_2)$ through $(Xf_5, Yf_5)$ whether the relations shown in formulae (1), (2) are fulfilled or not, and sets one or more human body detection frames corresponding to one or more object images at non-display, where necessary.

In the present example, human body detection frames corresponding to the object images 702, 704 are set at non-display, whereas the face detection frames 701a to 705a corresponding to the object images 701 to 705 and the human body detection frames 701b, 703b, and 705b corresponding to the object images 701, 703, and 705 are screen displayed, as shown in FIG. 7B. In this manner, the screen display can be prevented from becoming hard to see by setting one or more human body detection frames at non-display, where necessary.

Figure 8:
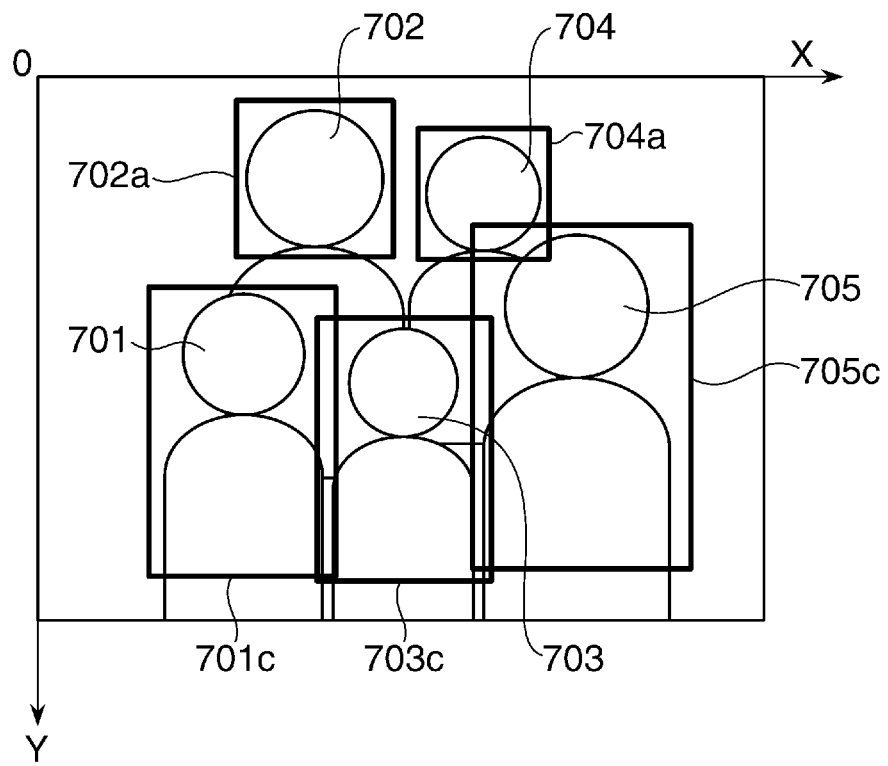
FIG. 8 is a view showing an example where face detection frames and human body detection frames are displayed while being integrated into object detection frames.

FIG. 8 shows an example where face detection frames and human body detection frames are displayed while being integrated into object detection frames.

In the case of an object image for which display of a face detection frame and display of a human body detection frame are both set at ON, it is possible to integrate the face detection frame and the human body detection frame into an object detection frame and to display the integrated object detection frame on the screen.

In the example shown in FIG. 7B, display of the human body detection frames 701b, 703b, and 705b corresponding to the object images 701, 703, and 705 is set at ON. The system controller 50 integrates the face detection frames 701a, 703a, and 705a and the human body detection frames 701b, 703b, and 705b corresponding to the object images 701, 703, and 705 into object detection frames (object display bodies) 701c, 703c, and 705c, and causes the integrated object detection frames 701c, 703c, and 705c to be screen displayed as shown in FIG. 8.

Second Embodiment

Next, a description will be given of an image pickup apparatus according to a second embodiment of this invention. The image pickup apparatus of this embodiment is basically the same as the apparatus of the first embodiment except for the procedures of the display control process performed by the system controller 50, and thus a description of the common points will be omitted.

In the first embodiment, in a case that face detection frames are juxtaposed in the vertical direction, one or more human body detection frames corresponding to one or more face detection frames located on an upper side are set at non-display to prevent the screen display from becoming hard to see. In this embodiment, in a case that adjacent face detection frames are juxtaposed in the horizontal direction and close to each other in distance, human body detection frames corresponding to these face detection frames are integrated for display into one human body detection frame.

Figure 9:
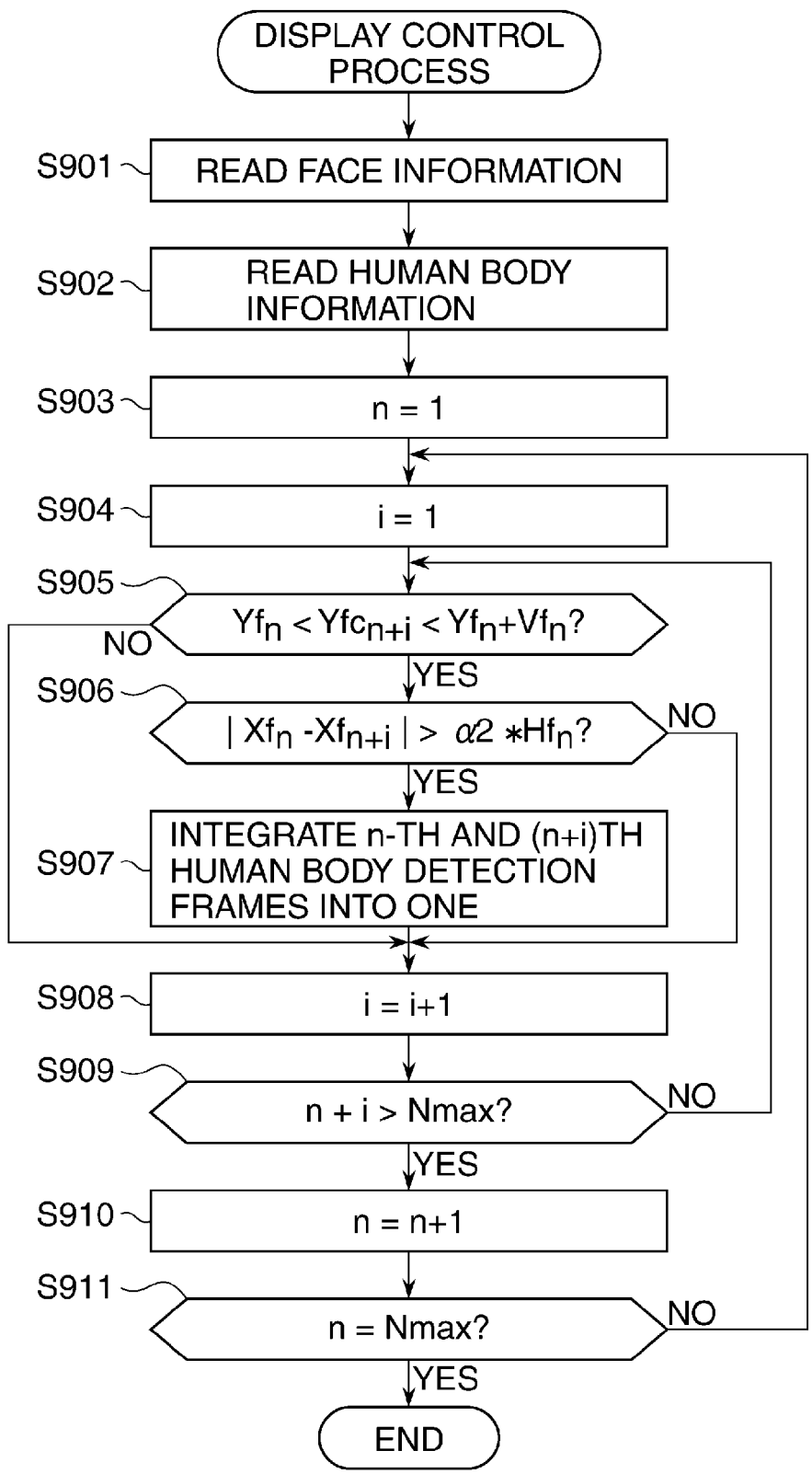
FIG. 9 is a flowchart showing the procedures of a display control process performed in a second embodiment of this invention to control display of face detection frames and human body detection frames.
Figure 10:
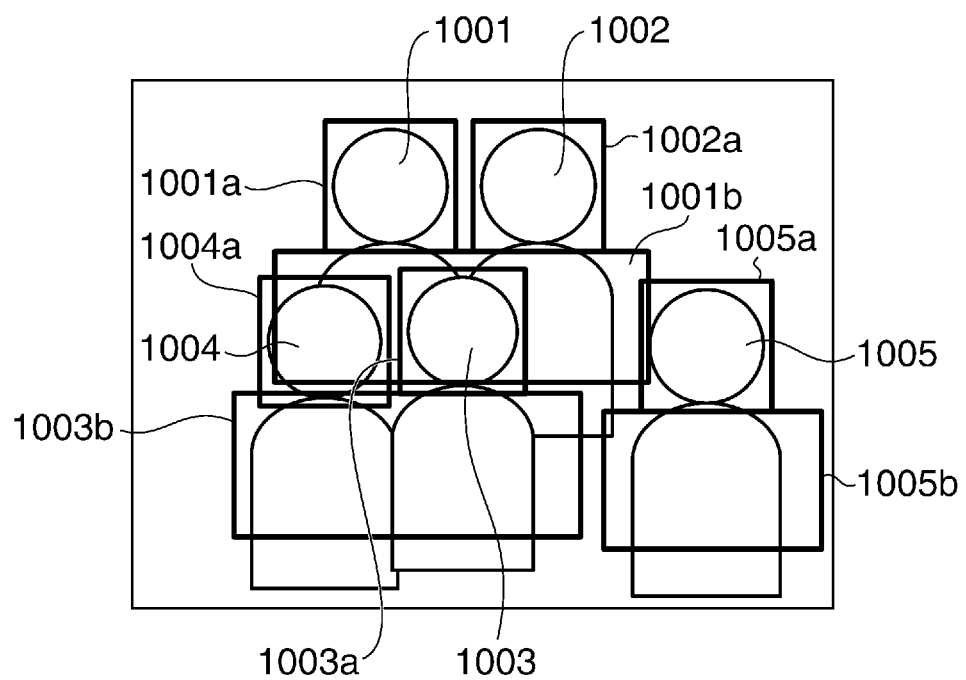
FIG. 10 is a view showing face detection frames and human body detection frames displayed according to the display control process shown in FIG. 9.

FIG. 9 shows, in flowchart, the procedures of a display control process performed by the system controller 50 to control display of face detection frames and human body detection frames. FIG. 10 shows face detection frames and human body detection frames displayed according to the display control process shown in FIG. 9.

At start of the display control process, the system controller 50 reads face information and human body information from the system memory 52 (steps S901 and S902).

Also in this embodiment, it is assumed that a plurality of (e.g., Nmax) face regions and a plurality of (e.g., Nmax) human body regions are detected by the face detection unit 104 and the human body detection unit 105. If only face regions are detected, it is regarded that there are human body regions below the face regions. If only human body regions are detected, it is regarded that there are face regions above the human body regions. It is also assumed that identification numbers of 1, 2, ..., Nmax are assigned to face information and to human body information (in the ascending order of Y coordinate values), which are recorded in the system memory 52. In the following, a coordinate (face detection coordinate) of the n-th face region (1≤n≤Nmax) is represented by $(Xf_n, Yf_n)$, and a size of the n-th face region is represented by $(Hf_n, Vf_n)$.

Next, the system controller 50 sets indexes n and i each for specifying face information (face region) to an initial value of 1 (steps S903 and S904), and determines whether or not the n-th and (n+i)th face regions are juxtaposed in the horizontal direction (step S905).

In step S905, the system controller 50 determines e.g. a face vertical detection position $Yf_n$ (Y axis direction start point) in the n-th face information, a Y axis direction end point $Yf_n+Vf_n$ in the n-th face information, and a Y axis direction center $Yfc_{n+i}(=Yf_{n+i}+Vf_{n+i}/2)$ in the (n+i)th face information. The system controller 50 then determines whether or not the Y axis direction center $Yfc_{n+i}$ is present between the Y axis direction start point $Yf_n$ and the Y axis direction end point $Yf_n+Vf_n$, to thereby determine whether or not the n-th and (n+i)th face regions are juxtaposed in the horizontal direction.

If determined that the Y axis direction center $Yfc_{n+i}$ in the (n+i)th face information is present between the Y axis direction start and end points $Yf_n$, $Yf_n+Vf_n$ in the n-th face information (YES to step S905), the system controller 50 determines whether or not the n-th and (n+i) th face regions are in proximity with each other in the horizontal direction (step S906). To this end, it is determined whether or not e.g. the absolute value of a difference between the face horizontal detection positions $Xf_n$, $Xf_{n+i}$ in the n-th face information and in the (n+i) th face information exceeds a predetermined threshold value. The threshold value is set to e.g. a value equal to the product $α2×Hf_n$ of the horizontal size $Hf_n$ in the n-th face information and a predetermined gain value α2. The gain value α2 is set to a value larger than 1, e.g., to a value of 2.

If determined that the n-th and (n+i)th face regions are in proximity with each other in the horizontal direction (YES to step S906), the system controller 50 integrates the n-th and (n+i)th human body detection frames into one (step S907), and increments the index i by one (step S908).

On the other hand, if determined that the n-th and (n+i)th face regions are not in proximity with each other in the horizontal direction (NO to step S905 or S906), the system controller 50 proceeds to step S908 where it increments the index i by one. In that case, step S907 is skipped, and therefore, the n-th and (n+i)th human body detection frames are not integrated into one.

Next, the system controller 50 determines whether or not the index n+i exceeds Nmax (step S909), if the answer to step S909 is NO, the flow returns to step S905. On the other hand, if the answer to step S909 is YES, the system controller 50 increments the index n by one (step S910). It should be noted that if determined that the face region represented by the incremented index n is in proximity with the precedingly determined face region in the horizontal direction, the index n can be further incremented by one.

Next, the system controller 50 determines whether or not the index n reaches Nmax (step S911). If the answer to step S911 is NO, the flow returns to step S904. On the other hand, if the answer to step S911 is YES, the system controller 50 completes the display control process.

It should be noted that in the present example, whether or not adjacent face regions are in proximity with each other is determined based on the Y axis direction start points in two pieces of face information, but this is not limitative. The determination can be performed based on the center positions of the face regions or based on the center positions of human body regions, while taking account of face region size or human body region size where required, or can be performed based on coordinate values of human body detection frames.

In the following, with reference to FIG. 10, a description will be given of how face detection frames and human body detection frames are displayed according to the display control process already described with reference to FIG. 9.

In the example shown in FIG. 10, five object images 1001 to 1005 are displayed on the screen of the display unit 28. The system controller 50 reads pieces of face information for five persons from the system memory 52, creates face detection frames 1001a to 1005a based on these face information, and causes the display unit 28 to display the face detection frames thereon.

As shown in FIG. 10, the face detection frames 1001a, 1002a are juxtaposed in the horizontal direction and close in distance to each other, and the face detection frames 1003a, 1004a are juxtaposed in the horizontal direction and close in distance to each other. Accordingly, the system controller 50 integrates human body detection frames corresponding to the face detection frames 1001a, 1002a into a human body detection frame 1001b, integrates human body detection frames corresponding to the face detection frames 1003a, 1004a into a human body detection frame 1003b, and causes the display unit 28 to display the human body detection frames 1001b, 1003b thereon. It should be noted that face detection frames are displayed separately from each other, even if they are close in distance to each other. As a result, the face regions of what object images have been successfully detected can be visually confirmed with ease on the screen.

Human body detection frames are integrated into e.g. a human body detection frame that includes all these human body detection frames. Alternatively, it is possible to integrate human body detection frames into a human body detection frame whose center position is vertically aligned with the position of gravity of center of the human body detection frames and whose vertical direction size becomes equal to a predetermined value.

In a case where a plurality of face detection frames are juxtaposed in the vertical direction, one or more human body detection frames that are located on an upper side, among human body detection frames into which human body detection frames corresponding to the plurality of face detection frames are integrated, can be made non-display by performing the display control process of this embodiment and then performing the display control process of the first embodiment.

Third Embodiment

Next, a description will be given of an image pickup apparatus according to a third embodiment of this invention. The image pickup apparatus of this embodiment is basically the same as the apparatus of the first embodiment except for the procedures of the display control process performed by the system controller 50, and thus a description of the common points will be omitted.

In this embodiment, in a case that human body regions are juxtaposed in the horizontal direction and a distance therebetween is less than a threshold value, these human body detection frames are displayed after their widths are adjusted such that they do not overlap each other.

Figure 11:
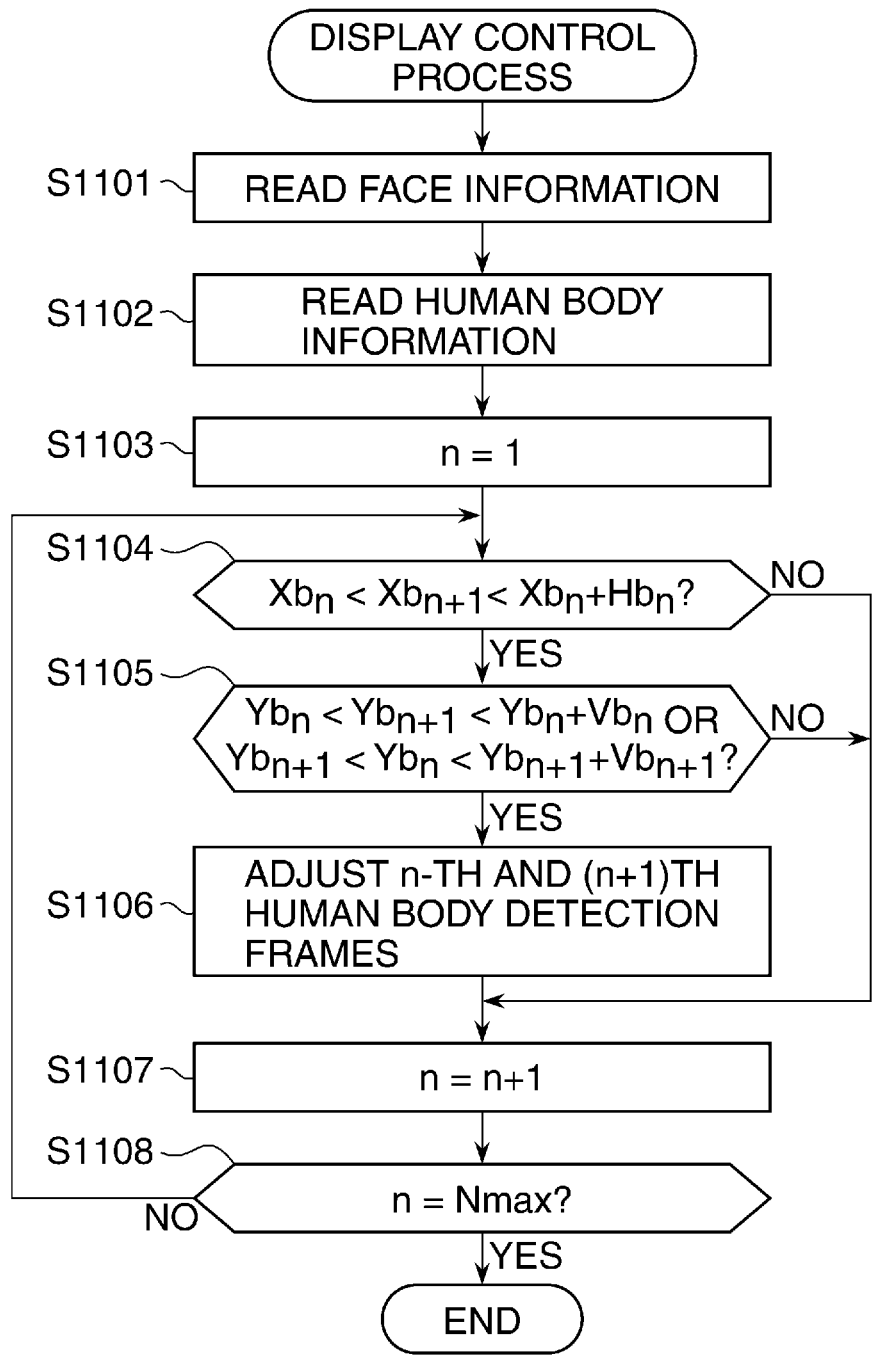
FIG. 11 is a flowchart showing the procedures of a display control process performed in a third embodiment of this invention to control display of face detection frames and human body detection frames.
Figure 12:
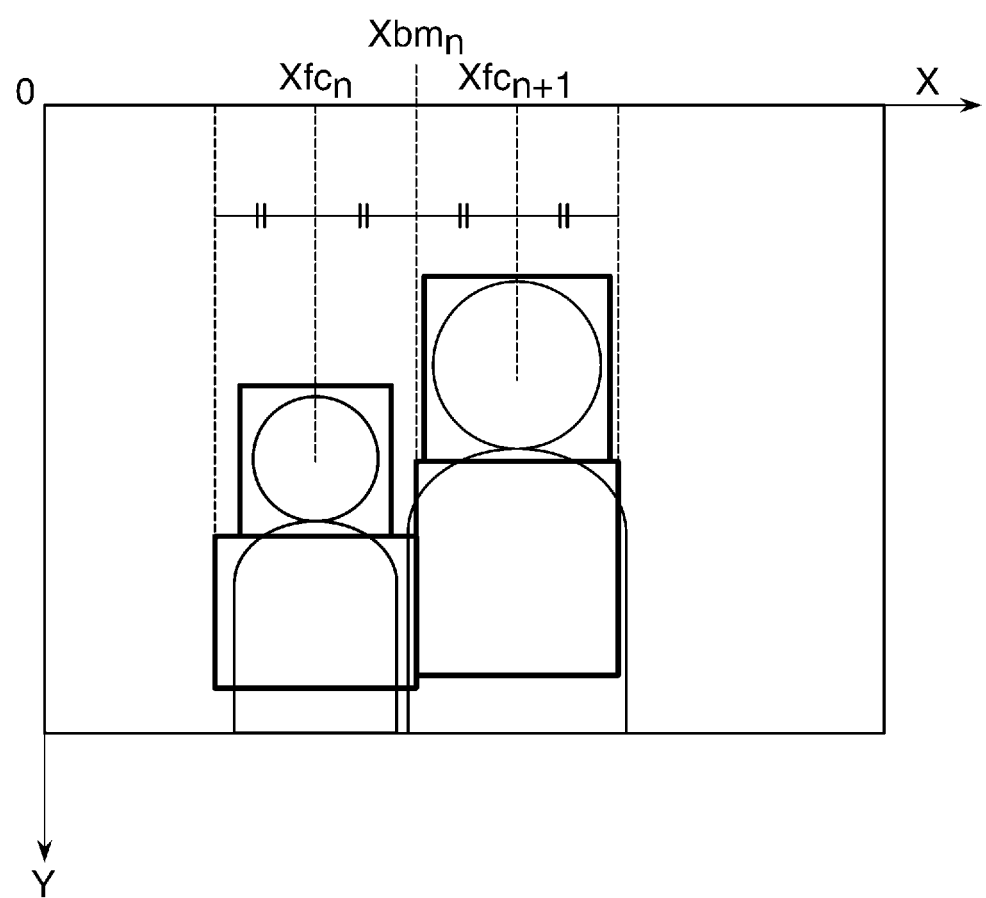
FIG. 12 is a view showing an example of face detection frames and human body detection frames displayed according to the display control process shown in FIG. 11.
Figure 13:
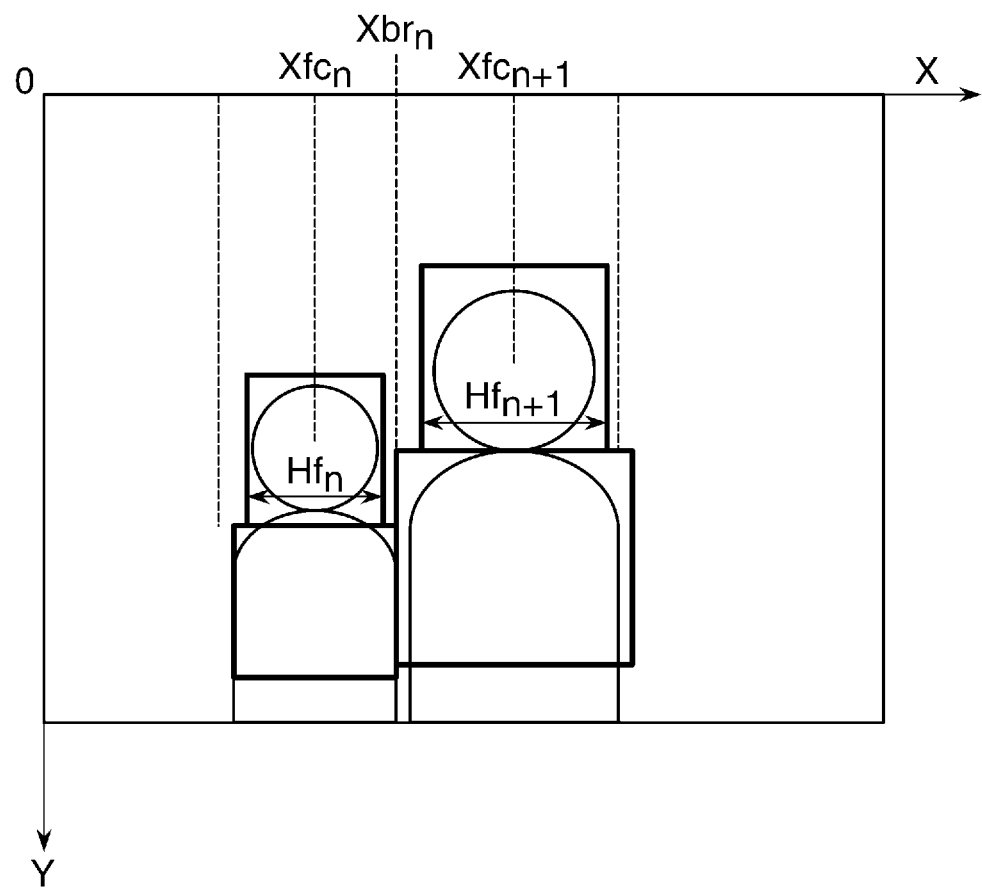
FIG. 13 is a view showing another example of face detection frames and human body detection frames displayed according to the display control process shown in FIG. 11.
Figure 14:
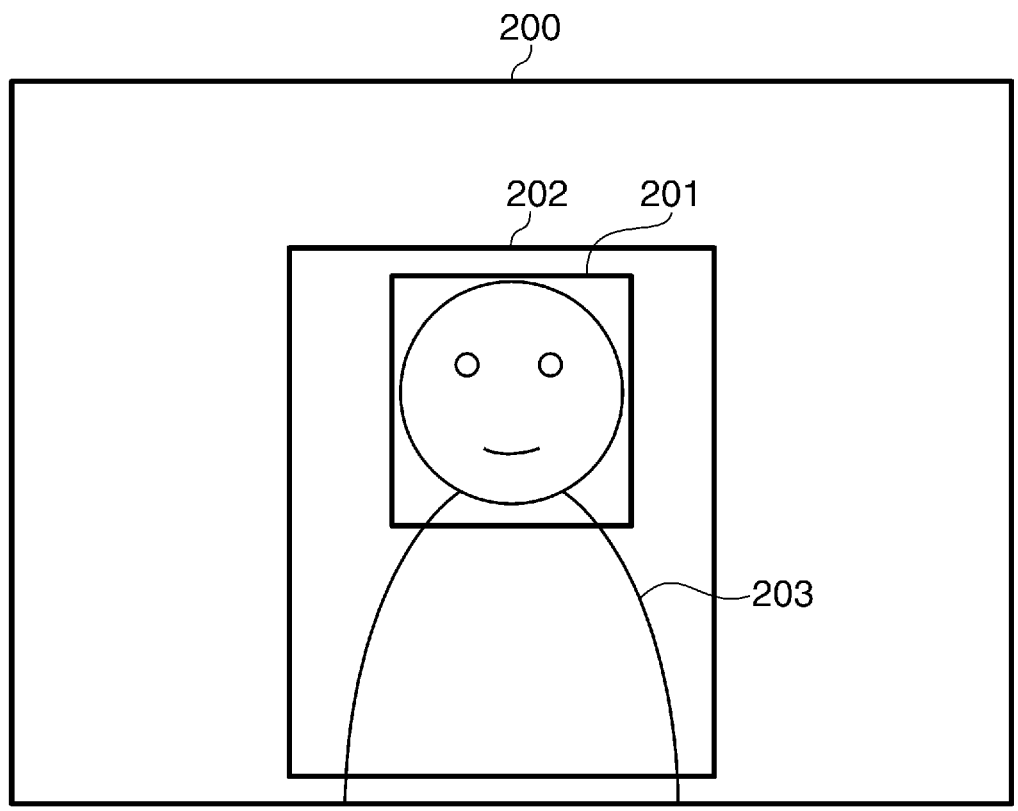
FIG. 14 is a view showing an example of display of a face detection frame and a human body detection frame in a conventional image pickup apparatus.
Figure 15:
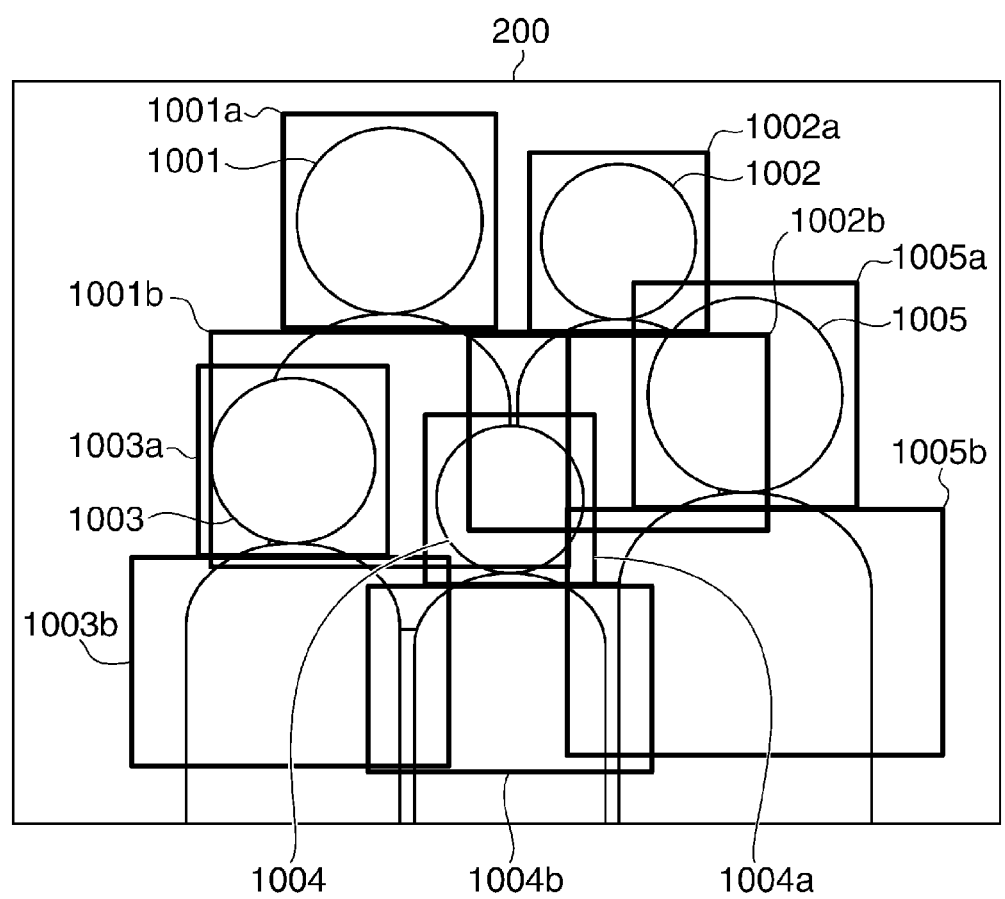
FIG. 15 is a view showing an example of display of face detection frames and human body detection frames in another conventional image pickup apparatus.

FIG. 11 shows, in flowchart, the procedures of a display control process performed by the system controller 50 to control display of face detection frames and human body detection frames, and FIGS. 12 and 13 each show face detection frames and human body detection frames displayed according to the display control process shown in FIG. 11.

At start of the display control process, the system controller 50 reads face information and human body information from the system memory 52 (steps S1101 and S1102).

Also in this embodiment, it is assumed that a plurality of (e.g., Nmax) face regions and a plurality of (e.g., Nmax) human body regions are detected by the face detection unit 104 and the human body detection unit 105. If only face regions are detected, it is regarded that there are human body regions below the face regions. If only human body regions are detected, it is regarded that there are face regions above the human body regions. It is also assumed that identification numbers of 1, 2, . . . , Nmax are assigned to face information and to human body information (in the ascending order of X coordinate values), which are recorded in the system memory 52. In the following, a coordinate (face detection coordinate) of the n-th human body region ($1 \le n \le Nmax$) is represented by ($Xb_n$, $Yb_n$), and a size of the n-th face region is represented by $Hb_n$, $Vb_n$.

Next, the system controller 50 sets an index n for specifying human body information (human body region) to an initial value of 1 (step S1103), and determines whether or not the n-th and (n+1)th human body regions are juxtaposed in the horizontal direction (step S1104).

In step S1104, the system controller 50 determines e.g. whether or not the X axis direction start point $Xb_{n+1}$ of the (n+1)th human body detection frame is located between the X axis direction start and end points $Xb_n$, $Xb_n+Hb_n$ of the n-th human body detection frame, thereby determining whether or not the n-th and (n+1)th human body detection frames are juxtaposed in the horizontal direction.

If determined that the n-th and (n+1)th human body regions are juxtaposed in the horizontal direction (YES to step S1104), the system controller 50 determines whether or not the n-th and (n+1)th human body regions overlap each other in the vertical direction (step S1105).

To this end, the system controller 50 determines e.g. whether or not the human body vertical detection position $Yb_{n+1}$ of the (n+1)th human body detection frame is located between the human body vertical detection position $Yb_n$ and the Y axis direction end point $Yb_n+Vb_n$ of the n-th human body detection frame. The system controller 50 also determines whether or not the human body vertical detection position $Yb_n$ of the n-th human body detection frame is located between the human body vertical detection position $Yb_{n+1}$ and the Y axis direction end point $Yb_{n+1}+Vb_{n+1}$ of the (n+1)th human body detection frame. If either one of these positional relations is satisfied, it is determined that the n-th and (n+1)th human body regions are juxtaposed in the vertical direction.

In that case (if YES to step S1105), the system controller 50 adjusts the n-th and (n+1)th human body detection frames (step S1106).

To this end, the system controller 50 first determines the X axis direction centers $Xfc_n$, $Xfc_{n+i}$ of the n-th and (n+1)th face detection frames, where $Xfc_n=Xf_n+Hf_n/2$ and $Xfc_{n+i}=Xf_{n+i}+Hf_{n+i}/2$. The system controller 50 then determines a coordinate value $Xbm_n$ that divides between the X axis direction centers $Xfc_n$, $Xfc_{n+i}$ of the n-th and (n+1)th face detection frames into two equal parts, where $Xbm_n=Xfc_n+(Xfc_{n+i}-Xfc_n)/2$.

Next, the system controller 50 corrects the X axis direction start and end points $Xb_n$, $Xb_n+Hb_n$ of the n-th human body detection frame to a value of $2*Xfc_n-Xbm_n$ and to a value of $Xbm_n$ respectively, and also corrects the X axis direction start and end points $Xb_{n+1}$, $Xb_{n+1}+Hb_{n+1}$ of the (n+1)th human body detection frame to a value of $Xbm_n$ and to a value of $2*Xfc_{n+i}-Xbm_n$, respectively, whereby horizontal direction widths of the n-th and (n+1)th human body detection frames are made small. As shown in FIG. 12, the n-th and (n+1)th human body detection frames do not overlap each other on the screen and center positions thereof become consistent with center positions of face detection frames.

It should be noted that in the present example, the widths of both the n-th and (n+1)th human body detection frames are made small. Alternatively, the width of only one of these detection frames can be made small.

In another method of adjusting human body detection frames, the system controller 50 determines the X axis direction centers $Xfc_n$, $Xfc_{n+i}$ of the n-th and (n+1) th face detection frames, and determines an X coordinate value $Xbr_n$ that divides a line segment connecting the centers $Xfc_n$, $Xfc_{n+i}$ in a ratio of J:K, which is a ratio between the face horizontal detection sizes $Hf_n$, $Hf_{n+1}$ in the n-th face information and in the (n+1)th face information.

Next, the system controller 50 corrects the X axis direction start and end points $Xb_n$, $Xb_n+Hb_n$ of the n-th human body detection frame to a value of $2*Xfc_n-Xbr_n$ and to a value of $Xbr_n$, respectively, and also corrects the X axis direction start and end points $Xb_{n+1}$, $Xb_{n+1}+Hb_{n+1}$ of the (n+1)th human body detection frame to a value of $Xbr_n$ and to a value of $2*Xfc_{n+i}-Xbr_n$, respectively. As a result, the n-th and (n+1)th human body detection frames do not overlap each other on the screen, and center positions thereof become consistent with center positions of face detection frames, as shown in FIG. 13.

After completion of adjustment of the human body detection frames, the system controller 50 increments the index n by one (step S1107), and then determines whether or not the index n reaches Nmax (step S1108). If the answer to step S1108 is NO, the flow returns to step S1104. If the index n reaches Nmax (YES to step S1108), the system controller 50 completes the display control process.

It should be noted that the method for determining whether or not a distance between human body regions is less than a threshold value is not limited to the above-described method. Such determination can be made based on center positions of face regions or based on center positions of human body regions. At that time, it is possible to take into consideration sizes of the face regions or sizes of the human body regions.

As described above, it is possible to prevent the screen display from becoming hard to see by adjusting (reducing) the widths of human body detection frames, if a distance between the human body regions is less than a threshold value. It should be noted that since face regions are seldom close to each other in composition, it is possible to adjust only the widths of human body detection frames, without adjusting the widths of face detection frames.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-206967, filed Sep. 20, 2012, and No. 2013-184110, filed Sep. 5, 2013, which are hereby incorporated by reference herein in their entirety.

What is claimed is:

1. An image display device in which when an image including a plurality of object images is displayed on a screen of a display device of the image display device, detection frames that specify detected regions including face frames and body frames respectively specifying face regions and body regions of the object images can be displayed on the screen so as to be associated with the object images, comprising:
   a non-transitory memory device;
   a central processor or a microprocessor;
   a determination unit configured, in a case where face regions of first and second object images are juxtaposed on the screen in a vertical direction, to determine which one of face frames for the first and second object images is located on an upper side on the screen; and
   a display control unit configured to decide that the body frame for the object image corresponding to the face frame determined by said determination unit as being located on an upper side on the screen is to be made non-display,
   wherein in a case where a horizontal direction distance between the face regions of the first and second object images is equal to or less than a predetermined first threshold value and a vertical direction distance between both the face regions exceeds a second threshold value, said determination unit determines which one of the face frames for the first and second object images is located on the upper side on the screen, and
   wherein the determination unit and the display control unit are implemented at least in part by the central processor or the microprocessor executing at least one program recorded on the non-transitory memory device.

2. The image display device according to claim 1, further including:
   a face detection unit configured to detect face regions of the first and second object images, and
   a body detection unit configured to detect body regions of the first and second object images,
   wherein the face detection unit and the body detection unit are implemented at least in part by the central processor or the microprocessor executing at least one program recorded on the non-transitory memory device.

3. The image display device according to claim 1, wherein the first threshold value is decided based on an X-axis direction size of the face frame for either the first object image or the second object image.

4. The image display device according to claim 1, wherein the second threshold value is decided based on a Y-axis direction size of the face frame for either the first object image or the second object image.

5. The image display device according to claim 1, wherein said display control unit integrates the face and body frames for the object image corresponding to the body frame having been decided not to be made non-display into an object display body and causes the display device to display the object display body on the screen.

6. The image display device according to claim 1, wherein the display control unit is further configured to, in a case where the face regions of the first and second object images are not juxtaposed on the screen in the vertical direction, cause display of the body frame.

7. An image display device in which when an image including a plurality of object images is displayed on a screen of a display device of the image display device, detection frames that specify detected regions including face frames and body frames respectively specifying face regions and body regions of the object images can be displayed on the screen so as to be associated with the object images, comprising:
 a non-transitory memory device;
 a central processor or a microprocessor;
 a determination unit configured to determine whether or not first and second object images are juxtaposed on the screen in a horizontal direction and a distance between the first and second object images is less than a threshold value; and
 a display control unit configured, in a case where it is determined by said determination unit that the first and second object images are juxtaposed in the horizontal direction and the distance between the first and second object images is less than the threshold value, to integrate the body frames for the first and second object images into an object display body and to cause the display device to display the object display body on the screen,
 wherein in a case where the object display body is displayed, said display control unit causes the display device to separately display the face frames for the first and second object images on the screen, and
 wherein the determination unit and the display control unit are implemented at least in part by the central processor or the microprocessor executing at least one program recorded on the non-transitory memory device.

8. The image display device according to claim 7, further including:
 a face detection unit configured to detect face regions of the first and second object images, and
 a body detection unit configured to detect body regions of the first and second object images,
 wherein the face detection unit and the body detection unit are implemented at least in part by the central processor or the microprocessor executing at least one program recorded on the non-transitory memory device.

9. An image display device in which when an image including a plurality of object images is displayed on a screen of a display device of the image display device, detection frames that specify detected regions including face frames and body frames respectively specifying face regions and body regions of the object images can be displayed on the screen so as to be associated with the object images, comprising:
 a non-transitory memory device;
 a central processor or a microprocessor;
 a determination unit configured to determine whether or not first and second object images are juxtaposed on the screen in a horizontal direction and a distance between the first and second object images is less than a threshold value; and
 a display control unit configured, in a case where it is determined by said determination unit that the first and second object images are juxtaposed in the horizontal direction and the distance between the first and second object images is less than the threshold value, to adjust a horizontal direction width of at least one of the body frames for the first and second object images,
 wherein in the case where it is determined by said determination unit that the first and second object images are juxtaposed in the horizontal direction and the distance between the first and second object images is less than the threshold value, said display control unit reduces the horizontal direction width of at least one of the body frames for the first and second object images, and
 wherein the determination unit and the display control unit are implemented at least in part by the central processor or the microprocessor executing at least one program recorded on the non-transitory memory device.

10. The image display device according to claim 9, further including:
 a face detection unit configured to detect face regions of the first and second object images, and
 a body detection unit configured to detect body regions of the first and second object images,
 wherein the face detection unit and the body detection unit are implemented at least in part by the central processor or the microprocessor executing at least one program recorded on the non-transitory memory device.

11. The image display device according to claim 9, wherein said display control unit adjusts widths of the body frames for the first and second object images based on a coordinate value that divides a line segment connecting centers of face regions of the first and second object images into two equal parts.

12. The image display device according to claim 9, wherein said display control unit adjusts widths of the body frames for the first and second object images based on a coordinate value that divides a line segment connecting centers of face regions of the first and second object images in a ratio between sizes of the face regions of the first and second object images.

13. A control method for an image display device in which when an image including a plurality of object images is displayed on a screen of a display device of the image display device, detection frames that specify detected regions including face frames and body frames respectively specifying face regions and body regions of the object images can be displayed on the screen so as to be associated with the object images, comprising:
 determining, in a case where face regions of first and second object images are juxtaposed on the screen in a vertical direction, which one of face frames for the first and second object images is located on an upper side on the screen; and
 not displaying the body frame for the object image corresponding to the face frame determined as being located on an upper side on the screen,
 wherein in a case where a horizontal direction distance between the face regions of the first and second object images is equal to or less than a predetermined first threshold value and a vertical direction distance between both the face regions exceeds a second threshold value, which one of the face frames for the first and second object images located on the upper side on the screen is determined.

14. A control method for an image display device in which when an image including a plurality of object images is displayed on a screen of a display device of the image display device, detection frames that specify detected regions including face frames and body frames respectively specifying face regions and body regions of the object images can be displayed on the screen so as to be associated with the object images, comprising:

determining whether or not first and second object images are juxtaposed on the screen in a horizontal direction and a distance between the first and second object images is less than a threshold value; and integrating, in a case where it is determined that the first and second object images are juxtaposed in the horizontal direction and the distance between the first and second object images is less than the threshold value, the body frames for the first and second object images into an object display body and causing the display device to display the object display body on the screen, wherein in a case where the object display body is displayed, the display device is caused to separately display the face frames for the first and second object images on the screen.

15. A control method for an image display device in which when an image including a plurality of object images is displayed on a screen of a display device of the image display device, detection frames that specify detected regions including face frames and body frames respectively specifying face regions and body regions of the object images can be displayed on the screen so as to be associated with the object images, comprising:

determining whether or not first and second object images are juxtaposed on the screen in a horizontal direction and a distance between the first and second object images is less than a threshold value; and adjusting, in a case where it is determined that the first and second object images are juxtaposed in the horizontal direction and the distance between the first and second object images is less than the threshold value, a horizontal direction width of at least one of the body frames for the first and second object images and causing the display device to display the at least one of the body frames having the adjusted width on the screen, wherein in the case where it is determined that the first and second object images are juxtaposed in the horizontal direction and the distance between the first and second object images is less than the threshold value, the horizontal direction width of at least one of the body frames for the first and second object images is reduced.

* * * * *